(12) United States Patent
Lee et al.

(10) Patent No.: US 11,376,974 B2
(45) Date of Patent: Jul. 5, 2022

(54) MONITORING SYSTEM AND POWER SUPPLY CONTROL METHOD

(71) Applicant: Coretronic Intelligent Robotics Corporation, Hsin-Chu (TW)

(72) Inventors: Cheng-Shen Lee, Hsin-Chu (TW); Chih-Neng Tseng, Hsin-Chu (TW); Kuan-Chou Ko, Hsin-Chu (TW)

(73) Assignee: Coretronic Intelligent Robotics Corporation, Hsinchu-Chu (TW)

( * ) Notice: Subject to any disclaimer, the term of this patent is extended or adjusted under 35 U.S.C. 154(b) by 206 days.

(21) Appl. No.: 16/736,799

(22) Filed: Jan. 7, 2020

(65) Prior Publication Data

US 2021/0170891 A1    Jun. 10, 2021

(30) Foreign Application Priority Data

Dec. 10, 2019 (TW) .................. 108145007

(51) Int. Cl.
*H02J 7/00* (2006.01)
*B60L 53/16* (2019.01)
(Continued)

(52) U.S. Cl.
CPC .............. *B60L 53/16* (2019.02); *B60L 53/62* (2019.02); *B64C 39/024* (2013.01);
(Continued)

(58) Field of Classification Search
None
See application file for complete search history.

(56) References Cited

U.S. PATENT DOCUMENTS 10,439,550 B1 * 10/2019 Goodman .............. B64D 45/08
10,462,366 B1   10/2019 Bart et al.
(Continued)

FOREIGN PATENT DOCUMENTS

CN    106130104    11/2016
CN    207029561    2/2018
(Continued)

OTHER PUBLICATIONS

"Office Action of Taiwan Related Application, application No. 108148707", dated Dec. 16, 2020, p. 1-p. 8.
(Continued)

*Primary Examiner* — Arun C Williams
(74) *Attorney, Agent, or Firm* — JCIPRNET (57) ABSTRACT

A power supply control method and a monitoring system configured to implement the power supply control method are provided. The monitoring system includes a base station, a drone, and a processor. The base station includes a charging device. The charging device includes a power supply connector and a power source coupled to the power supply connector and outputting electric power through the power supply connector. The drone includes a battery configured to provide electric power to the drone and a charging connector configured to connect the battery and the power supply connector. When the charging connector is connected to the power supply connector, the processor determines an abnormal situation on the power supply connector or the drone according to an electrical characteristic during charging the battery by the power source. The abnormal situation is associated with a foreign object formed on the power supply connector or the drone.

18 Claims, 6 Drawing Sheets

(51) Int. Cl.
*B60L 53/62* (2019.01)
*B64C 39/02* (2006.01)

(52) U.S. Cl.
CPC .......... *H02J 7/0032* (2013.01); *H02J 7/0044* (2013.01); *H02J 7/0047* (2013.01); *H02J 7/007182* (2020.01)

(56) References Cited

U.S. PATENT DOCUMENTS

| | | | |
|---|---|---|---|
| 2017/0057365 A1* | 3/2017 | Cho | B60L 53/126 |
| 2017/0146344 A1* | 5/2017 | Clark | G05D 1/0094 |
| 2017/0244270 A1* | 8/2017 | Waters | H02J 50/90 |
| 2018/0072170 A1* | 3/2018 | Evans | B60L 53/60 |
| 2018/0257502 A1* | 9/2018 | Park | B64C 25/32 |

FOREIGN PATENT DOCUMENTS

| | | |
|---|---|---|
| CN | 105322464 | 6/2018 |
| CN | 108502201 | 9/2018 |
| CN | 108698709 | 10/2018 |
| CN | 105763230 | 11/2018 |
| CN | 108945506 | 12/2018 |
| CN | 109565180 | 4/2019 |
| CN | 110073573 | 7/2019 |
| CN | 110196453 | 9/2019 |
| CN | 209356927 | 9/2019 |
| CN | 209479989 | 10/2019 |
| CN | 108466567 | 11/2019 |
| CN | 209617529 | 11/2019 |
| WO | 2019125596 | 6/2019 |
| WO | 2019179126 | 9/2019 |
| WO | 2019216975 | 11/2019 |

OTHER PUBLICATIONS

"Office Action of Taiwan Counterpart Application", dated Jul. 1, 2020, p. 1-p. 6.
"Office Action of Taiwan Counterpart Application", dated Jul. 28, 2021, p. 1-p. 8.
Office Action of Taiwan Counterpart Application, dated Nov. 30, 2021, pp. 1-8.
Hung-Ju Hsu et al.,"Lithium Battery Charger", 2017 Student's Practical Project Report, Department of Electronic Engineering, NCUT, Jun. 2017, Submit with English translation thereof, pp. 1-10.

\* cited by examiner

MONITORING SYSTEM AND POWER SUPPLY CONTROL METHOD

CROSS-REFERENCE TO RELATED APPLICATION

This application claims the priority benefit of Taiwan patent application serial no. 108145007, filed on Dec. 10, 2019. The entirety of the above-mentioned patent application is hereby incorporated by reference herein and made a part of this specification.

BACKGROUND OF THE INVENTION

Field of the Invention

The invention relates to a monitoring technology for a drone, and in particular, to a monitoring system and a power supply control method for a drone.

Description of Related Art

A monitoring technology is applied by various industries to monitor devices, buildings, or other assets. Research units may monitor animals or ecology, and government agencies may monitor roads, parks, or entrances and exits. In order to eliminate human factors, automatic monitoring is available today, and automatic monitoring devices may be arranged at specific locations for environmental monitoring. The automatic monitoring device may include a drone and a charging device. However, because the charging device is usually placed outdoors, and a charging plate of the charging device is usually made of metal, the charging plate may be subject to moisture or even rust due to climate, or a foreign object may fall on the charging plate. The foregoing situations affect the charging efficiency and cause problems including unexpected energy consumption and temperature rise. In addition, the drone may be incompletely charged or unable to be fully charged within a fixed time. As a result, the charging time needs to be extended, thereby affecting task execution frequency and efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides a monitoring system and a power supply control method to detect an abnormal situation on a charging connector and accordingly report or compensate for a power supply loss caused by the abnormal situation.

Other advantages can be further illustrated by the technical features broadly embodied and described as follows.

In order to achieve one or a part or all of the foregoing objectives or other objectives, a monitoring system provided in an embodiment of the invention includes a base station, a drone, and a processor. The base station includes a charging device. The charging device includes a power supply connector and a power source. The power source is coupled to the power supply connector, and outputs electric power through the power supply connector. The drone includes a battery and a charging connector. The battery is configured to provide electric power to the drone. The charging connector is configured to connect the battery and the power supply connector. When the charging connector is connected to the power supply connector, the processor determines an abnormal situation on the power supply connector or the drone according to an electrical characteristic during charging the battery by the power source. The abnormal situation is associated with a foreign object formed on the power supply connector or the drone.

In an embodiment of the invention, the electrical characteristic includes a voltage difference. The processor determines the voltage difference between a battery voltage of the battery and a power supply voltage of the power supply connector, and determines, according to a difference between the voltage difference and a difference threshold, whether to send a warning message.

In an embodiment of the invention, the electrical characteristic includes an impedance value. The processor determines the impedance value according to a voltage difference between a battery voltage of the battery and a power supply voltage of the power supply connector and a power supply current of the power supply connector, and determines, according to a difference between the impedance value and an impedance threshold, whether to send a warning message.

In an embodiment of the invention, the charging device further includes a power source controller. The power source controller is coupled to the power source and configured to adjust a power supply setting of the power source according to the electrical characteristic. The power supply setting affects the electrical characteristic, and the power source controller compensates for, through the adjusted power supply setting, a power supply loss caused by a voltage difference between a battery voltage of the battery and a power supply voltage of the power supply connector.

In an embodiment of the invention, the power supply setting includes a switching condition for two charging modes. The two charging modes include a constant current mode and a constant voltage mode. The switching condition includes a critical voltage. When the power supply voltage is greater than the critical voltage, the power source controller switches the constant current mode to the constant voltage mode, and the power source controller adjusts the critical voltage according to the voltage difference.

In an embodiment of the invention, the power source controller takes a sum of the voltage difference and the critical voltage as a new critical voltage.

In an embodiment of the invention, the power supply setting includes an output voltage of the power source, and the power source controller adjusts the output voltage according to the voltage difference to change the power supply voltage.

In an embodiment of the invention, the power source controller increases the output voltage.

In an embodiment of the invention, the power source controller determines whether an adjustment instruction associated with the compensation for the power supply loss is received within a specified time. When the power source controller does not receive the adjustment instruction within the specified time, the power source controller adjusts the power supply setting to a preset value. The preset value associated with the power supply setting is not changed. When the power source controller receives the adjustment instruction within the specified time, the power source controller sets the power supply setting according to the adjustment instruction.

In an embodiment of the invention, the processor determines, according to a battery voltage of the battery, whether the charging connector is connected to the power supply connector.

In an embodiment of the invention, the processor determines, according to a battery status of the battery, whether to charge the battery through the power source. The battery status is associated with a capacity of the battery, individual voltages of a plurality of cells in the battery, or a voltage difference between the plurality of cells.

In order to achieve one or a part or all of the foregoing objectives or other objectives, a power supply control method provided in an embodiment of the invention includes following steps: providing a power supply connector at a base station for a charging connector of a drone to connect the power supply connector; and when the charging connector is connected to the power supply connector, determining an abnormal situation on the power supply connector or the drone according to an electrical characteristic during charging the battery of the drone by the power source. The abnormal situation is associated with a foreign object formed on the power supply connector or the drone.

In an embodiment of the invention, the electrical characteristic includes a voltage difference. The determination of the abnormal situation on the power supply connector includes following steps: determining the voltage difference between a battery voltage of the battery and a power supply voltage of the power supply connector; and determining, according to a difference between the voltage difference and a difference threshold, whether to send a warning message.

In an embodiment of the invention, the electrical characteristic includes an impedance value. The determination of the abnormal situation on the power supply connector includes following steps: determining the impedance value according to a voltage difference between a battery voltage of the battery and a power supply voltage of the power supply connector and a power supply current of the power supply connector; and determining, according to a difference between the impedance value and an impedance threshold, whether to send a warning message.

In an embodiment of the invention, after the abnormal situation on the power supply connector is determined, the method further includes following steps: adjusting a power supply setting of the power source according to the electrical characteristic, where the power supply setting affects the electrical characteristic; and compensating for, through the adjusted power supply setting, a power supply loss caused by a voltage difference between a battery voltage of the battery and a power supply voltage of the power supply connector.

In an embodiment of the invention, the power supply setting includes a switching condition for two charging modes. The two charging modes include a constant current mode and a constant voltage mode. The switching condition includes a critical voltage. When the power supply voltage is greater than the critical voltage, the constant current mode is switched to the constant voltage mode. The compensating for a power supply loss includes: adjusting the critical voltage according to the voltage difference.

In an embodiment of the invention, the adjusting the critical voltage according to the voltage difference includes the following step: taking a sum of the voltage difference and the critical voltage as a new critical voltage.

In an embodiment of the invention, the power supply setting includes an output voltage of the power source, and the compensating for a power supply loss includes the following step: adjusting the output voltage according to the voltage difference to change the power supply voltage.

In an embodiment of the invention, the adjusting the output voltage according to the voltage difference includes the following step: increasing the output voltage.

In an embodiment of the invention, the compensating for a power supply loss includes the following steps: determining whether an adjustment instruction associated with the compensation for the power supply loss is received within a specified time; when the adjustment instruction is not received within the specified time, adjusting the power supply setting to a preset value, where the preset value associated with the power supply setting is not changed; and when the adjustment instruction is received within the specified time, setting the power supply setting according to the adjustment instruction.

Based on the above, in one or more embodiments of the invention, it is determined, according to the electrical characteristic (for example, the voltage difference or the impedance value), whether the power supply connector at the base station or the drone is affected by a foreign object or other abnormal situations, and a switching timing of the charging mode or a magnitude of the power supply voltage is adjusted accordingly, thereby compensating for the power supply loss caused by the abnormal situation. In this way, charging efficiency is improved, and the possibility of fully charging the drone is increased.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Unless limited otherwise, the terms "connected," "coupled," and "mounted" and variations thereof herein are used broadly and encompass direct and indirect connections, couplings, and mountings. Besides, the terminology "signal" may refer to as at least one current, voltage, charge, temperature, data, electromagnetic wave, or any other one or more signal.

Figure 1:
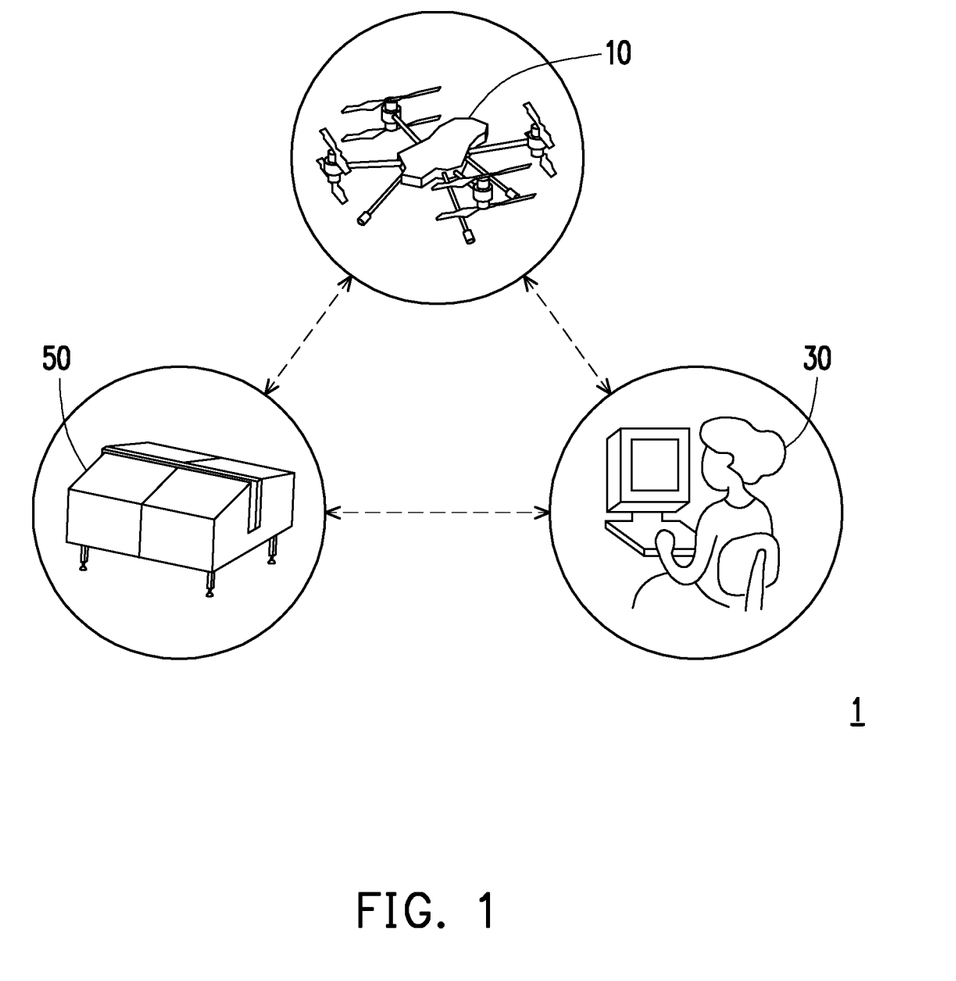
FIG. 1 is a schematic diagram of a monitoring system according to an embodiment of the invention.

FIG. 1 is a schematic diagram of a monitoring system 1 according to an embodiment of the invention. Referring to FIG. 1, the monitoring system 1 includes but is not limited to a drone 10, a monitoring server 30, and a base station 50.

Figure 2:
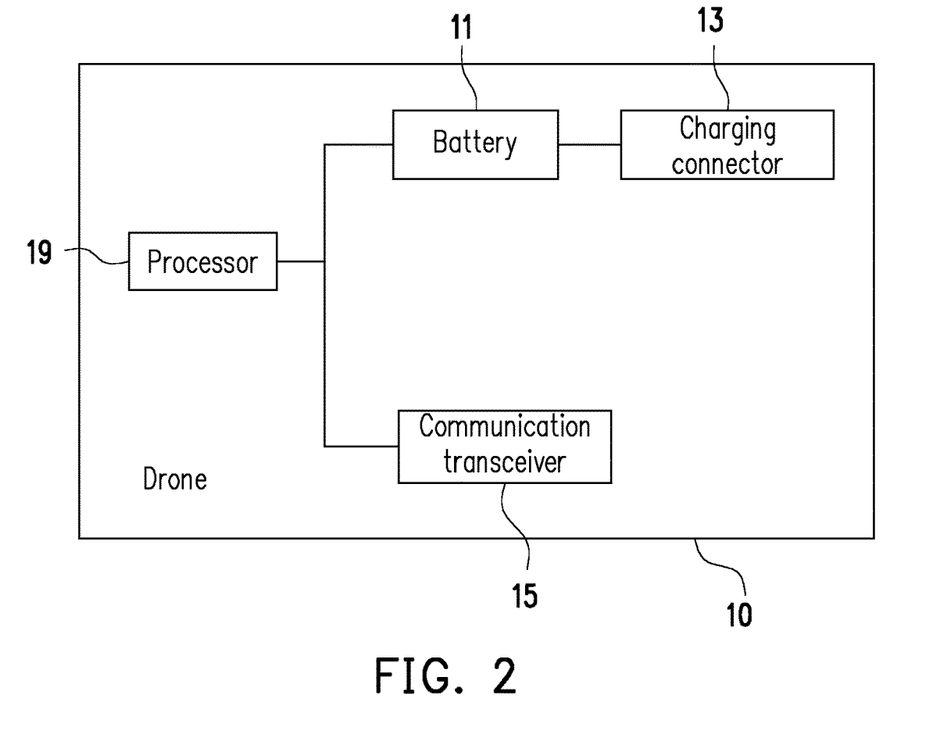
FIG. 2 is a block diagram of a drone according to an embodiment of the invention.

FIG. 2 is a block diagram of a drone 10 according to an embodiment of the invention. Referring to FIG. 2, the drone 10 includes but is not limited to a battery 11, a charging connector 13, a communication transceiver 15, and a processor 19.

The battery 11 may be a lithium battery, a fuel cell, a nickel-cadmium battery, a nickel-hydrogen battery, or other rechargeable batteries.

The charging connector 13 may be various types of connectors such as a terminal, a jack, a pin header, a pin, and a plug. The charging connector 13 is connected to the battery 11 and is configured to connect to an external power source (for example, a mains power supply, a power converter, or other power supply devices) to charge the battery 11.

The communication transceiver 15 may be a transceiver that supports wireless communications technologies such as Wi-Fi, Bluetooth, fourth generation (4G), or other generation mobile communication.

The processor 19 is coupled to the battery 11 and the communication transceiver 15, and may be a central processing unit (CPU), a microcontroller, a chip programmable controller, an application-specific integrated circuit (ASIC), a field programmable gate array (FPGA) or other similar elements or a combination of the foregoing elements. In the embodiment, the processor 19 is configured to control all operations of the drone 10.

Figure 3:
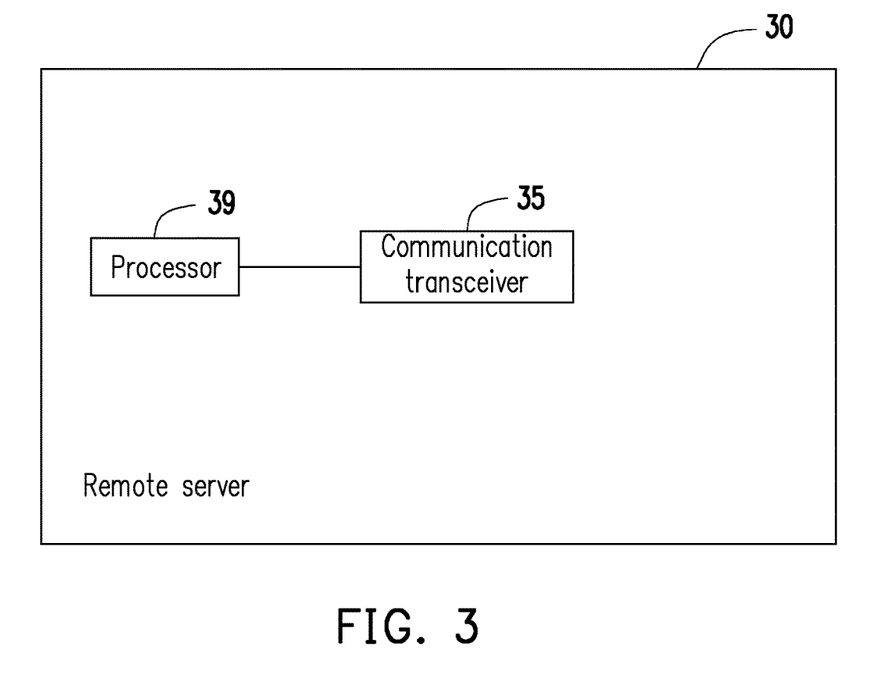
FIG. 3 is a block diagram of a remote server according to an embodiment of the invention.

FIG. 3 is a block diagram of a remote server 30 according to an embodiment of the invention. Referring to FIG. 3, the remote server 30 includes but is not limited to a communication transceiver 35 and a processor 39. The remote server 30 may be an electronic device such as a desktop computer, a notebook computer, various types of servers, a smartphone, or a tablet computer.

For an implementation of the communication transceiver 35, refer to the description of the communication transceiver 15. The descriptions thereof are omitted herein. In some embodiments, the communication transceiver 35 may also support, for example, Ethernet, an optical network, or other types of wired communication networks. The communication transceiver 35 may directly communicate with the communication transceiver 15 or forward a message of the communication transceiver 15 through other intermediate devices (for example, a base station 50, a base station, or a router).

The processor 39 is coupled to the communication transceiver 35. For an implementation of the processor 39, refer to the description of the processor 19. The descriptions thereof are omitted herein. In the embodiment, the processor 39 is configured to control all operations of the remote server 30.

Figure 4:
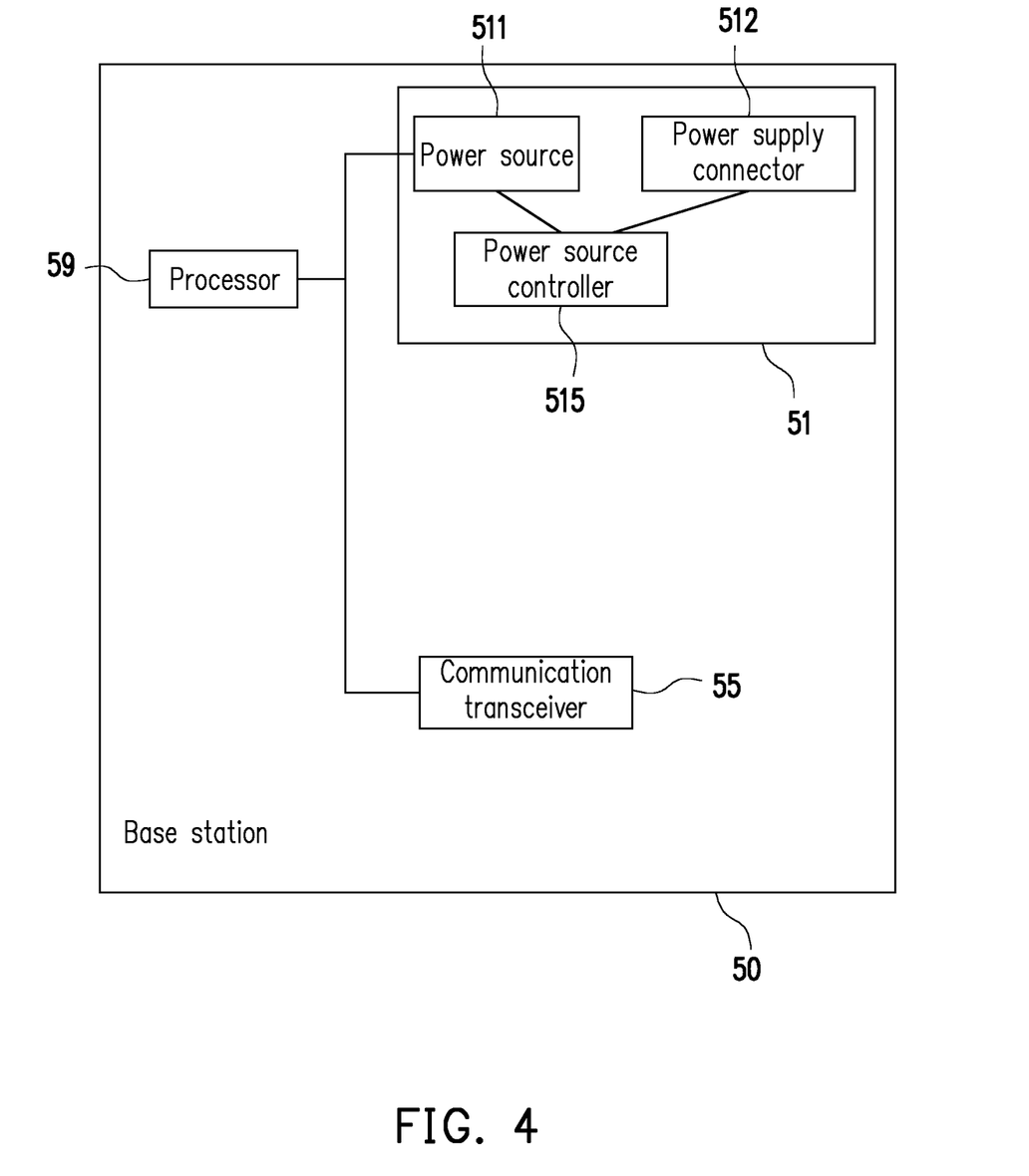
FIG. 4 is a block diagram of a base station according to an embodiment of the invention.

FIG. 4 is a block diagram of a base station 50 according to an embodiment of the invention. Referring to FIG. 4, the base station 50 includes but is not limited to a charging device 51, a communication transceiver 55, and a processor 59.

The charging device 51 includes but is not limited to a power source 511, a power supply connector 512, and a power source controller 515. The power source 511 may be a mains power supply, a generator, a solar panel, a battery that is the same as or similar to the battery 11, or a combination of two or more of the above. The power supply connector 512 may be a connector such as a terminal, a jack, a pin header, a pin, a plug, or a charging plate, and may be connected to a charging connector 13 of a drone 10, and is electrically connected to the power source 511. The power source controller 515 may be a processor, a chip, or a circuit. The power source controller 515 is connected to the power source 511 and the power supply connector 512, so that the power source 511 provides electric power for a connected external device (for example, the drone 10 or other electronic devices) through the power supply connector 512.

For an implementation of the communication transceiver 55, refer to the description of the communication transceiver 35. The descriptions thereof are omitted herein. The communication transceiver 55 may directly communicate with a communication transceiver 15 and/or the communication transceiver 35 or forward messages of the communication transceivers 15 and 35 through other intermediate devices (for example, a base station or a router).

The processor 59 is coupled to the charging device 51 and the communication transceiver 55. For an implementation of the processor 59, refer to the description of the processor 19. The descriptions thereof are omitted herein. In the embodiment, the processor 59 is configured to control all operations of the base station 50.

In order to facilitate understanding of an operation procedure of the embodiments of the invention, the following describes an operation procedure of the monitoring system 1 in the embodiments of the invention in detail using a plurality of embodiments. In the following, the method in the embodiments of the invention is described in combination with apparatuses and elements or modules thereof in the monitoring system 1. Each procedure of the method may be adjusted according to an implementation situation, and is not limited thereto. In addition, for convenience of illustration, the processor 59 of the base station 50 is used as an example and used as an operating body below. However, some operations of the processor 59 may be alternatively performed by the processor 19 of the drone 10 or the processor 39 of the remote server 30, and a related signal or data is sent or received through the communication transceivers 15, 35, 55.

Figure 5:
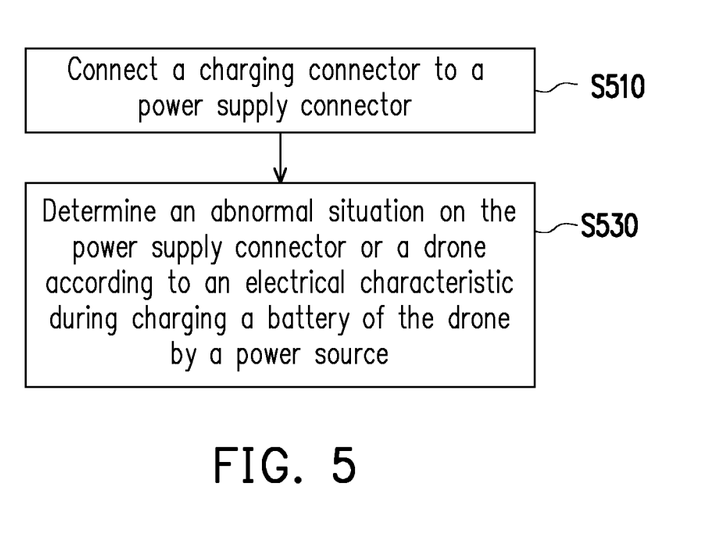
FIG. 5 is a flowchart of a power supply control method according to an embodiment of the invention.

FIG. 5 is a flowchart of a power supply control method according to an embodiment of the invention. Referring to FIG. 5, a charging connector 13 of a drone 10 is connected to a power supply connector 512 of a base station 50 (step S510). In particular, the embodiment of the invention is mainly directed to a charging mechanism in which charging connecting ports (that is, the charging connector 13 and the power supply connector 512) of the drone 10 and the base station 50 are in contact.

Figure 6:
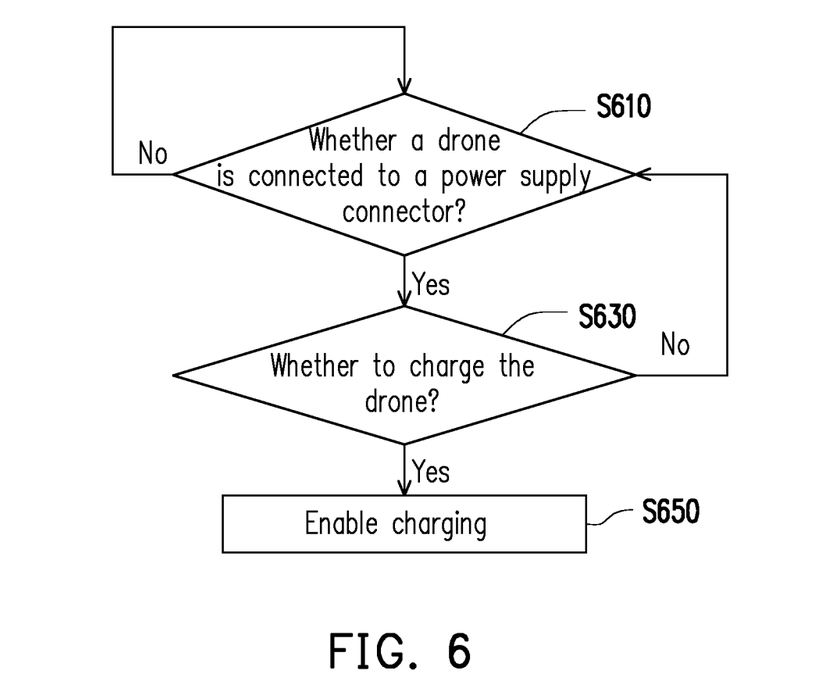
FIG. 6 is a flowchart of connection confirmation according to an embodiment of the invention.

FIG. 6 is a flowchart of connection confirmation according to an embodiment of the invention. Referring to FIG. 6, a processor 59 may determine, according to a battery voltage of a battery 11, whether a charging connector 13 of a drone 10 is connected to a power supply connector 512 (step S610). A power source controller 515 includes a detection circuit for a battery voltage. The processor 59 may determine, through the power source controller 515, whether the battery voltage of the battery 11 can be measured/interpreted, or whether a value of the battery voltage is within an allowable range (the value of the battery voltage may be within a range between a minimum battery voltage and a maximum battery voltage of the battery 11, but may still be adjusted according to other requirements), to confirm a connection situation. If the battery voltage can be measured/interpreted or the value of the battery voltage is within the allowable range, the processor 59 confirms that the charging connector 13 is connected to the power supply connector 512. For example, the charging connector 13 is two pins that extend outward from a body of the drone 10, and the power supply connector 512 is two charging plates that are disposed on a platform of the base station 50 and are exposed. When the two pins are in direct contact with the two charging plates, the power source controller 515 may interpret the value of the battery voltage. In addition, if the battery voltage cannot be measured/interpreted or the value of the battery voltage is not within the allowable range, the processor 59 confirms that the charging connector 13 is not connected to the power supply connector 512, and step S510 is repeatedly performed at fixed or irregular intervals until the charging connector 13 is connected to the power supply connector 512.

If the charging connector 13 is connected to the power supply connector 512, the processor 59 determines whether to charge the power source 511 of the drone 10 through the charging device 51 (step S630). In an embodiment, the processor 59 may determine, according to a battery status of the battery 11, whether to charge the battery 11 through the power source 511. The battery status may be associated with a capacity of the battery 11, individual voltages of a plurality of cells in the battery 11, or a voltage difference between the cells. For example, the charging condition may be that the capacity of the battery 11 is lower than a charging threshold (for example, 10%, 20%, or 80%), and voltages of any or specified quantity of cells are within a voltage safety range (the voltage may be a value between the minimum battery voltage and the maximum battery voltage of the battery 11, but may still be adjusted according to other requirements), or a voltage difference between any or specified quantity of cells is within a voltage difference safety range.

It may be specified that the foregoing charging conditions are considered together or only some of the foregoing charging conditions are considered. If the foregoing charging conditions are considered together, when any one of the foregoing charging conditions is not met, the processor 59 instructs the charging device 51 not to charge the battery 11. In particular, when the capacity of the battery 11 is higher than the charging threshold, the processor 59 considers that the battery 11 does not need to be charged yet, and instructs the charging device 51 not to charge the battery 11; or if the voltages of the cells are not within the voltage safety range and/or the voltage difference between the cells is not within the voltage difference safety range, the processor 59 considers that the battery 11 is abnormal, and instructs the charging device 51 not to charge the battery 11. In some embodiments, when the battery 11 is abnormal (that is, for example, the voltages of the cells are not within the voltage safety range and/or the voltage difference between the cells is not within the voltage difference safety range), the processor 59 may further send a warning message such as a text message, an email, or a push notification to a remote server 30 or other external devices through a communication transceiver 55, or the processor 59 sends a warning message such as a sound, a picture, or a luminance color through a speaker, a display, or a lighting device.

In addition, if the foregoing charging conditions are considered together, when the foregoing charging conditions are all met, for example, the capacity of the battery 11 is lower than the charging threshold, the voltages of the cells are within the voltage safety range, and the voltage difference between the cells is within the voltage difference safety range, the processor 59 instructs or controls the charging device 51 to charge the battery 11 that is, enable charging) (step S650). For example, the charging device 51 turns on a charging switch. However, only some of the foregoing charging conditions may be considered to determine whether to charge the battery 11 through the power source 511, for example, only the capacity of the battery 11 is considered, only the voltages of the cells are considered, or only the voltage difference between the single cells is considered. The invention is not limited thereto.

It should be noted that, in other embodiments, the processors 19 and 39 receive an interpretation result of the power source controller 515 through the communication transceivers 15 and 35 to determine whether a connection situation of the charging connector 13 and the power supply connector 512 meets the charging condition. In addition, in some embodiments, the processor 59 may also directly enable charging when the charging connector 13 is connected to the power supply connector 512.

Returning to FIG. 5, when the charging connector 13 is connected to the power supply connector 512, the processor 59 determines an abnormal situation on the power supply connector 512 or the drone 10 according to an electrical characteristic during charging the battery 11 by the power source 511 (step S530). In an embodiment, the abnormal situation is associated with a foreign object formed on the power supply connector 512 or the drone 10. The foreign object may be an oxide or a hydroxide (that is, rust) formed by a surface material of a charging-related element such as the power supply connector 512, the charging connector 13 of the drone 10, a connecting wire or connecting element, or the battery 11 due to oxidation, a leaf, dust, or an object other than a body of the drone 10. In another embodiment, the abnormal situation is associated with a damage to the power supply connector 512 or the drone 10, for example, suffering from corrosion, fracture, or loss.

The abnormal situation may affect a charging situation. For example, charging efficiency is reduced, the battery 11 cannot be charged to a specific amount of electricity, or a temperature rises. The charging situation may be represented by the electrical characteristic during charging the battery 11 by the power source 511. In other words, in the embodiment of the invention, the abnormal situation is determined based on a correlation between the abnormal situation and the electrical characteristic.

Figure 7:
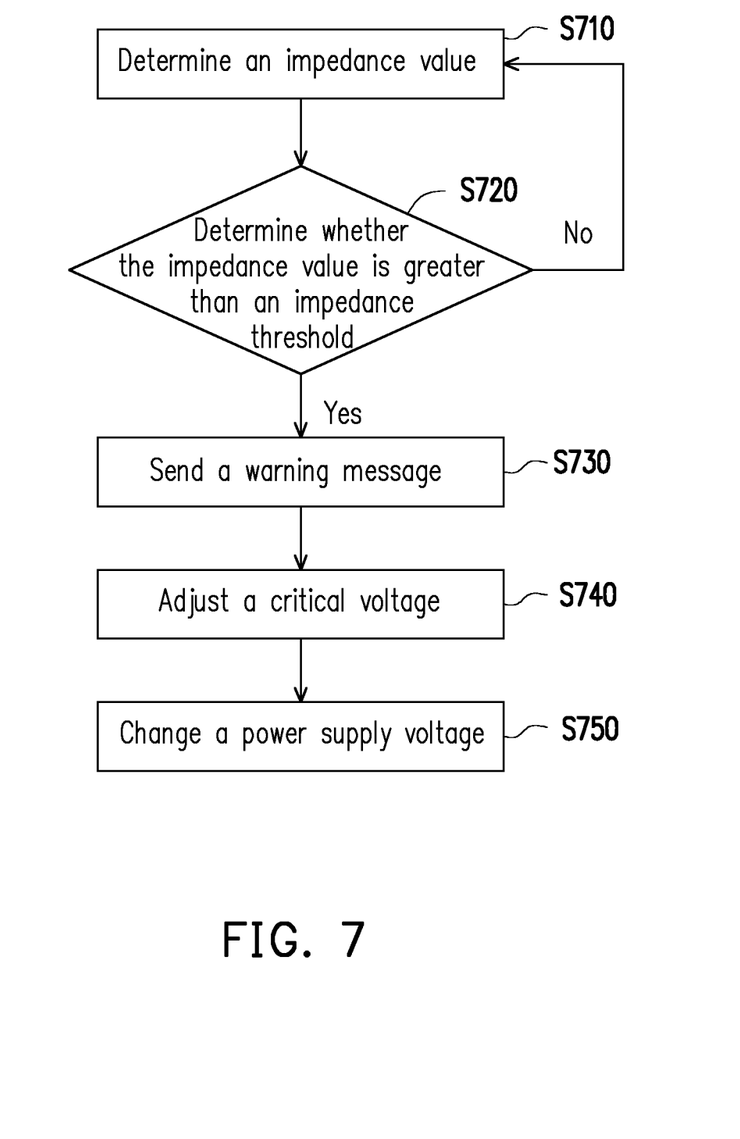
FIG. 7 is a flowchart of power supply compensation according to an embodiment of the invention.

FIG. 7 is a flowchart of power supply compensation according to an embodiment of the invention. Referring to FIG. 7, in an embodiment, the electrical characteristic includes an impedance value. According to an experimental result or an actual situation, the abnormal situation on the power supply connector 512 may cause an impedance value of the power supply connector 512 to increase. The power source controller 515 may separately interpret a battery voltage of the battery 11, a power supply voltage of the power supply connector 512 (for example, a voltage of any conductive substance on the power supply connector 512), and a power supply current of the power supply connector 512 (for example, a current of any conductive substance on the power supply connector 512 or an output current of the power supply 511), and the processor 59 determines the impedance value of the power supply connector 512 according to a voltage difference between the battery voltage and the power supply voltage of the power supply connector 512 and the power supply current of the power supply connector 512 (step S710). The processor 59 may determine, according to a difference between the impedance value and an impedance threshold, whether to send a warning message. The impedance threshold may be a predefined value, and is associated with an impedance value measured in an abnormal case in which there is no foreign object on the power supply connector 512 or the drone 10 (but may still be adjusted according to other requirements). Because the abnormal situation causes the impedance value to increase, the processor 59 may determine whether the impedance value is greater than the impedance threshold (that is, the foregoing difference) (step S720).

If the impedance value is not greater than the impedance threshold, the processor 59 determines the impedance value of the power supply connector 512 when the next time the power supply connector 512 is connected to the charging connector 13 (return to step S710). In addition, if the impedance value is greater than the impedance threshold, the processor 59 considers that the abnormal situation occurs, and sends the warning message accordingly (step S730). For the sending of the warning message, refer to the foregoing description of sending of the warning message due to an abnormality of the battery 11. The descriptions thereof are omitted herein.

It should be noted that, in some embodiments, the processor 59 considers a case in which the impedance value is not equal to the impedance threshold as a condition that the difference does not conform to a normal situation. In addition, in other embodiments, the processors 19 and 39 receive, through the communication transceivers 15 and 35, a result of interpreting the impedance value by the power source controller 515 or the processor 59, to determine whether the abnormal situation occurs.

When the abnormal situation occurs, the base station 50 may enable a charging compensation mechanism. In an embodiment, the power source controller 515 adjusts a power supply setting of the power source 511 (for example, the output voltage/current of the power source 511, a switching condition for a charging mode of the power source 511, or selection of the charging mode) according to the electrical characteristic (for example, the impedance value of the power supply connector 512). The power supply setting affects the electrical characteristic. In particular, due to the increase of the impedance value, electric power supplied by the power source 511 may be additionally consumed by the foreign object or in other damaged situations. If a current and/or a voltage provided by the power source 511 still maintain/maintains an initial power supply setting (for example, a preset value, where the preset value associated with the power supply setting is not changed), an output power provided for the battery 11 may be insufficient (in comparison with an output power when there is no abnormal situation). On the contrary, if the power supply setting of the power source changes and the output power provided by the charging device 51 increases, a power supply loss (for example, the output voltage/current of power supply 511 is insufficient or the output power is insufficient) caused by the voltage difference between the battery voltage of the battery 11 and the power supply voltage of the power supply connector 512 can be compensated for through the adjusted power supply setting.

In an embodiment, the power supply setting includes a switching condition for two charging modes. The two charging modes include a constant current (CC) mode and a constant voltage (CV) mode, and the switching condition includes a critical voltage. The initial power supply setting of the charging mechanism may be that the power source controller 515 is maintained in the constant current mode, that is, the output current of the power supply 511 is maintained at a constant value. An output current in the constant current mode may be a maximum output current of the power source 511, and is greater than an output current in the constant voltage mode or other values, to achieve a fast charging function, thereby saving a charging time. In addition, when the power supply voltage of the power supply connector 512 is greater than the critical voltage (that is, the switching condition), the power source controller 515 switches the constant current mode to the constant voltage mode (that is, the output voltage of the power supply 511 is maintained at the constant value). The abnormal situation on the power supply connector 512 causes the power supply voltage of the power supply connector 512 to increase, and the power supply voltage when the abnormal situation occurs reaches the critical voltage earlier than when there is no abnormal situation, thereby reducing a charging time in the constant current mode, that is, a fast charging time becomes shorter. Changing the constant current mode/the fast charging time affects charging efficiency, and the power source controller 515 may adjust the critical voltage according to the voltage difference between the battery voltage and the power supply voltage (step S740). In an embodiment, the power source controller 515 takes a sum of the voltage difference and the critical voltage as a new critical voltage to increase a maintaining time of the constant current mode. For example, if the voltage difference is 1 volt and the critical voltage is 24 volts, the new critical voltage is 25 volts. In comparison with the original critical voltage, it takes more time for the power supply voltage to reach the new critical voltage, so that the charging time in constant current mode can be extended. In another embodiment, the power source controller 515 may increase the critical voltage by a specific value (possibly related to a ratio of the voltage difference or a fixed value) as a new critical voltage. For example, if the critical voltage is 30 volts, the new critical voltage is 32, 35, or 36 volts.

It should be noted that, according to different battery characteristics, a fast charging effect can be implemented in the constant current mode when a capacity of the battery is below a specific percentage (for example, 70% or 80%). Therefore, a remaining capacity of the battery 11 may also be taken into account for the new critical voltage.

In another embodiment, the power supply setting includes the output voltage of the power source 511. The power source controller 515 may adjust the output voltage according to the voltage difference to change the power supply voltage (step S750). After the power supply voltage reaches the critical voltage and the power source 511 is switched to the constant voltage mode, the power source controller 515 may increase the output voltage of the power source 511, to increase the battery voltage of the battery 11 to an expected voltage level, thereby compensating for the power supply loss (for example, increasing a possibility of fully charging the battery 11).

In addition to the foregoing compensation mechanism based on the impedance value, in an embodiment, the electrical characteristic includes a voltage difference, and the processor 59 may determine the voltage difference between a battery voltage of the battery 11 and a power supply voltage of the power supply connector 512, and determine, according to a difference between the voltage difference and a difference threshold, whether to send a warning message. According to an experimental result or an actual situation, the abnormal situation on the power supply connector 512 may cause the voltage difference between the power supply voltage of the power supply connector 512 and the battery voltage to increase. The difference threshold may be a predefined value, and is associated with a power supply voltage measured in an abnormal case in which there is no foreign object on the power supply connector 512 or the drone 10 (but may still be adjusted according to other requirements). Because the abnormal situation causes the voltage difference to increase, the processor 59 may determine whether the voltage difference is greater than the difference threshold (that is, the foregoing difference).

If the voltage difference is not greater than the difference threshold, the processor 59 determines the voltage difference when the next time the power supply connector 512 is connected to the charging connector 13. In addition, if the voltage difference is greater than the difference threshold, the processor 59 considers that the abnormal situation occurs, and sends the warning message accordingly. For the sending of the warning message, refer to the foregoing description of sending of the warning message due to an abnormality of the battery 11. The descriptions thereof are omitted herein.

It should be noted that, in other embodiments, the processors 19 and 39 receive, through the communication transceivers 15 and 35, a result of interpreting the voltage difference by the power source controller 515 or the processor 59, to determine whether the abnormal situation occurs.

Figure 8:
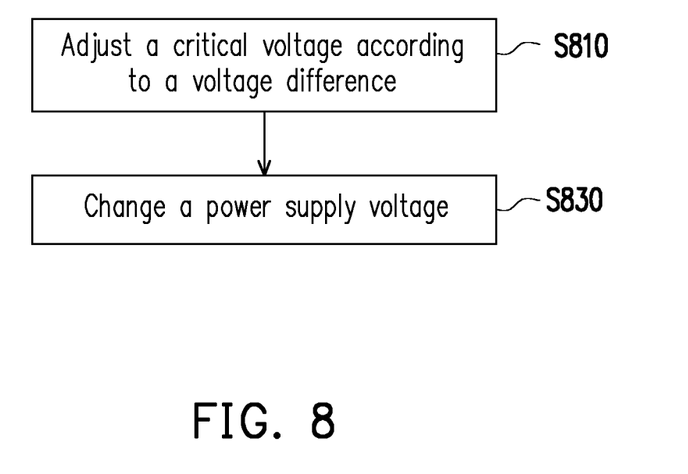
FIG. 8 is a flowchart of power supply compensation according to another embodiment of the invention.

In addition, the power source controller 515 may also adjust the power supply setting of the power source 511 according to the voltage difference between the battery voltage and the power supply voltage of the power supply connector 512. That is, a charging compensation mechanism is enabled. FIG. 8 is a flowchart of power supply compensation according to another embodiment of the invention. Referring to FIG. 8, in an embodiment, the power source controller 515 may adjust the critical voltage according to the voltage difference (step S810). For step S810, refer to the foregoing description of step S740. The descriptions thereof are omitted herein. In addition, in another embodiment, the power source controller 515 may also adjust the output voltage according to the voltage difference (step S830). For step S830, refer to the foregoing description of step S750. The descriptions thereof are omitted herein.

It should be noted that a timing of sending the warning message and a timing of adjusting the power supply setting are not limited to sequences in the embodiments in FIG. 7 and FIG. 8, and the processor 59 may perform either of sending the warning message and adjusting the power supply setting. In addition, the power supply setting is not limited to the two charging modes, and the power source controller 515 may also adjust only the output voltage and/or the output current.

Figure 9:
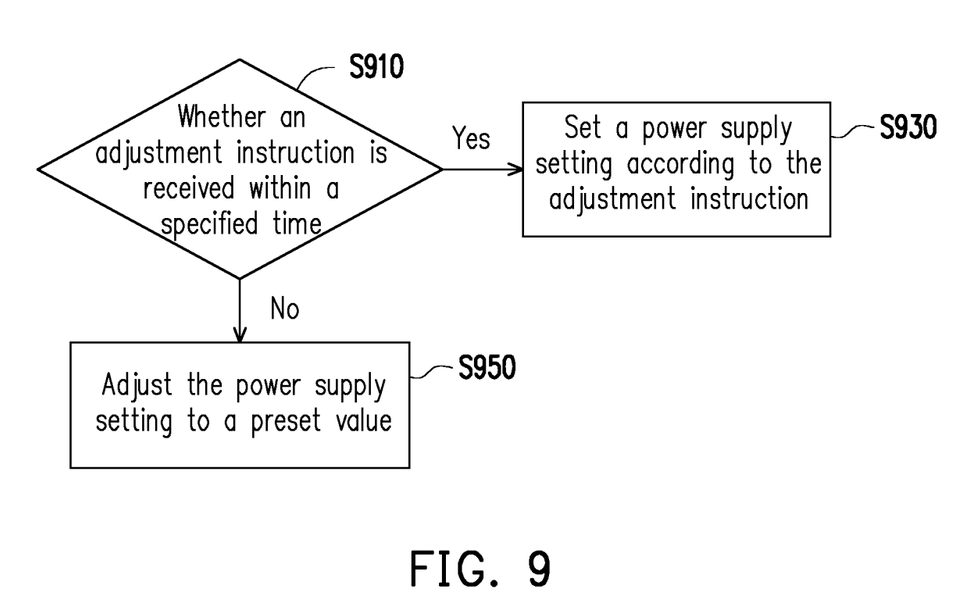
FIG. 9 is a flowchart of power supply setting adjustment according to an embodiment of the invention.

In addition, during the implementation of the charging compensation mechanism, the embodiment of the invention further provides a foolproof mechanism. FIG. 9 is a flowchart of power supply setting adjustment according to an embodiment of the invention. Referring to FIG. 9, the power source controller 515 may determine whether an adjustment instruction (for example, an adjustment instruction for changing the critical voltage or the output voltage) associated with the compensation for the power supply loss is received within a specified time (for example, 500 milliseconds, 1 second, or 3 seconds) (step S910). When the power source controller 515 receives the adjustment instruction from the processor 19, 39, or 59 within the specified time, the power source controller 515 may set the power supply setting according to the adjustment instruction (step S930). For example, the power source controller 515 performs step S740, S750, S810, or S830 to change the critical voltage or the output voltage. In addition, when the power source controller 515 does not receive the adjustment instruction within the specified time, the power source controller 515 may adjust the power supply setting to a preset value (step S950). The preset value associated with the power supply setting is not changed. For example, the power source controller 515 does not change the critical voltage or the output voltage. In this way, a malfunction caused by abnormal communication can be avoided.

In view of the above, according to the monitoring system and the power supply control method in the embodiments of the invention, the abnormal situation on the power supply connector can be automatically determined, the warning message is sent when the abnormal situation occurs, and/or the power supply loss is further compensated for. In this way, it can be ensured that the drone can be charged normally, and therefore flight safety problems such as insufficient power are prevented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the inven-

What is claimed is:

1. A monitoring system, comprising:
a base station, comprising:
a charging device, comprising:
a power supply connector;
a power source, coupled to the power supply connector and configured to output electric power through the power supply connector; and
a power source controller coupled to the power source and configured to adjust a power supply setting of the power source according to an electrical characteristic, wherein the power supply setting affects the electrical characteristic, and the power source controller compensates for, through the adjusted power supply setting, a power supply loss caused by a voltage difference between a battery voltage of the battery and a power supply voltage of the power supply connector;
a drone, comprising:
a battery, configured to provide the electric power to the drone; and
a charging connector, configured to connect the battery and the power supply connector; and
a processor, wherein
when the charging connector is connected to the power supply connector, the processor determines an abnormal situation on the power supply connector or on the drone according to the electrical characteristic during charging the battery by the power source, wherein the abnormal situation is associated with at least one foreign object formed on the power supply connector or the drone.

2. The monitoring system according to claim 1, wherein the electrical characteristic comprises a voltage difference, and the processor determines the voltage difference between a battery voltage of the battery and a power supply voltage of the power supply connector, and determines, according to a difference between the voltage difference and a difference threshold, whether to send a warning message.

3. The monitoring system according to claim 1, wherein the electrical characteristic comprises an impedance value, and the processor determines the impedance value according to a voltage difference between a battery voltage of the battery and a power supply voltage of the power supply connector and a power supply current of the power supply connector, and determines, according to a difference between the impedance value and an impedance threshold, whether to send a warning message.

4. The monitoring system according to claim 1, wherein the power supply setting comprises a switching condition for two charging modes, the two charging modes comprise a constant current mode and a constant voltage mode, the switching condition comprises a critical voltage, and when the power supply voltage is greater than the critical voltage, the power source controller switches the constant current mode to the constant voltage mode, and the power source controller adjusts the critical voltage according to the voltage difference.

5. The monitoring system according to claim 4, wherein the power source controller takes a sum of the voltage difference and the critical voltage as a new critical voltage.

6. The monitoring system according to claim 1, wherein the power supply setting comprises an output voltage of the power source, and the power source controller adjusts the output voltage according to the voltage difference to change the power supply voltage.

7. The monitoring system according to claim 6, wherein the power source controller increases the output voltage.

8. The monitoring system according to claim 1, wherein the power source controller determines whether an adjustment instruction associated with the compensation for the power supply loss is received within a specified time;
when the power source controller does not receive the adjustment instruction within the specified time, the power source controller adjusts the power supply setting to a preset value, wherein the preset value associated with the power supply setting is not changed; and
when the power source controller receives the adjustment instruction within the specified time, the power source controller sets the power supply setting according to the adjustment instruction.

9. The monitoring system according to claim 1, wherein the processor determines, according to a battery voltage of the battery, whether the charging connector is connected to the power supply connector.

10. The monitoring system according to claim 1, wherein the processor determines, according to a battery status of the battery, whether to charge the battery through the power source, wherein the battery status is associated with a capacity of the battery, individual voltages of a plurality of cells in the battery, or a voltage difference between the plurality of cells.

11. A power supply control method, comprising:
providing a power supply connector at a base station for a charging connector of a drone to connect the power supply connector;
when the charging connector is connected to the power supply connector, determining an abnormal situation on the power supply connector or on the drone according to an electrical characteristic during charging a battery of the drone by a power source, wherein the abnormal situation is associated with at least one foreign object formed on the power supply connector or on the drone;
adjusting a power supply setting of the power source according to the electrical characteristic, wherein the power supply setting affects the electrical characteristic; and
compensating for, through the adjusted power supply setting, a power supply loss caused by a voltage difference between a battery voltage of the battery and a power supply voltage of the power supply connector.

12. The power supply control method according to claim 11, wherein the electrical characteristic comprises a voltage difference, and the step of determining the abnormal situation on the power supply connector comprises:
determining the voltage difference between a battery voltage of the battery and a power supply voltage of the power supply connector; and
determining, according to a difference between the voltage difference and a difference threshold, whether to send a warning message.

13. The power supply control method according to claim 11, wherein the electrical characteristic comprises an impedance value, and the step of determining the abnormal situation on the power supply connector comprises:
determining the impedance value according to a voltage difference between a battery voltage of the battery and a power supply voltage of the power supply connector and a power supply current of the power supply connector; and determining, according to a difference between the impedance value and an impedance threshold, whether to send a warning message.

14. The power supply control method according to claim 11, wherein the power supply setting comprises a switching condition for two charging modes, the two charging modes comprise a constant current mode and a constant voltage mode, the switching condition comprises a critical voltage, when the power supply voltage is greater than the critical voltage, the constant current mode is switched to the constant voltage mode, and the step of compensating for the power supply loss comprises:

adjusting the critical voltage according to the voltage difference.

15. The power supply control method according to claim 14, wherein the step of adjusting the critical voltage according to the voltage difference comprises:

taking a sum of the voltage difference and the critical voltage as a new critical voltage.

16. The power supply control method according to claim 11, wherein the power supply setting comprises an output voltage of the power source, and the step of compensating for the power supply loss comprises:

adjusting the output voltage according to the voltage difference to change the power supply voltage.

17. The power supply control method according to claim 16, wherein the step of adjusting the output voltage according to the voltage difference comprises:

increasing the output voltage.

18. The power supply control method according to claim 11, wherein the step of compensating for the power supply loss comprises:

determining whether an adjustment instruction associated with the compensation for the power supply loss is received within a specified time;

when the adjustment instruction is not received within the specified time, adjusting the power supply setting to a preset value, wherein the preset value associated with the power supply setting is not changed; and when the adjustment instruction is received within the specified time, setting the power supply setting according to the adjustment instruction.

* * * * *